United States Patent
Westfall et al.

[11] Patent Number: 5,199,730
[45] Date of Patent: Apr. 6, 1993

[54] SPINDLE ASSEMBLY FOR EXTENDING THE TURNING ANGLE OF A MOTOR VEHICLE AND REDUCING TIRE WEAR

[76] Inventors: Rodney D. Westfall, 1920 Fairview Ave., Fruitland, Id. 83619; Kevin C. Davis, 615 N. 6th St., Payette, Id. 83661

[21] Appl. No.: 744,926

[22] Filed: Aug. 14, 1991

[51] Int. Cl.$^5$ ............................................ B62D 7/18
[52] U.S. Cl. ............................................ 280/96.1
[58] Field of Search .................... 280/96.1, 93, 674

[56] References Cited

U.S. PATENT DOCUMENTS

| | | | |
|---|---|---|---|
| 641,204 | 1/1900 | Gray | 280/96.1 |
| 1,016,838 | 2/1912 | Luck | 280/96.1 |
| 2,402,562 | 6/1946 | Lewis | 280/96.1 |
| 3,801,124 | 4/1974 | Afanador et al. | 280/96.1 |
| 3,908,480 | 9/1975 | Afanador et al. | 280/96.1 |
| 4,600,205 | 7/1986 | Stewart et al. | 280/95.1 |

FOREIGN PATENT DOCUMENTS 0138049 7/1985 Japan ........................... 280/96.1

*Primary Examiner*—Tamara L. Graysay
*Attorney, Agent, or Firm*—William J. Bethurum

[57] ABSTRACT

A steering knuckle for operation in the front wheel base of a motor vehicle wherein the rotational pivot point for the spindle of the steering knuckle is extended by a predetermined ball joint arm length $R_E$, thereby increasing the arc length in radians that the spindle will move in response to a given force applied to the tie rod arm of the steering knuckle. In this manner, the time that the tire surface of a wheel is in contact with the surface of a road during the time that the vehicle is making a turn is minimized, and this in turn minimizes the tire wear for the vehicle by reducing the forces of sliding friction received by the surface of the tire during vehicle turns.

5 Claims, 2 Drawing Sheets

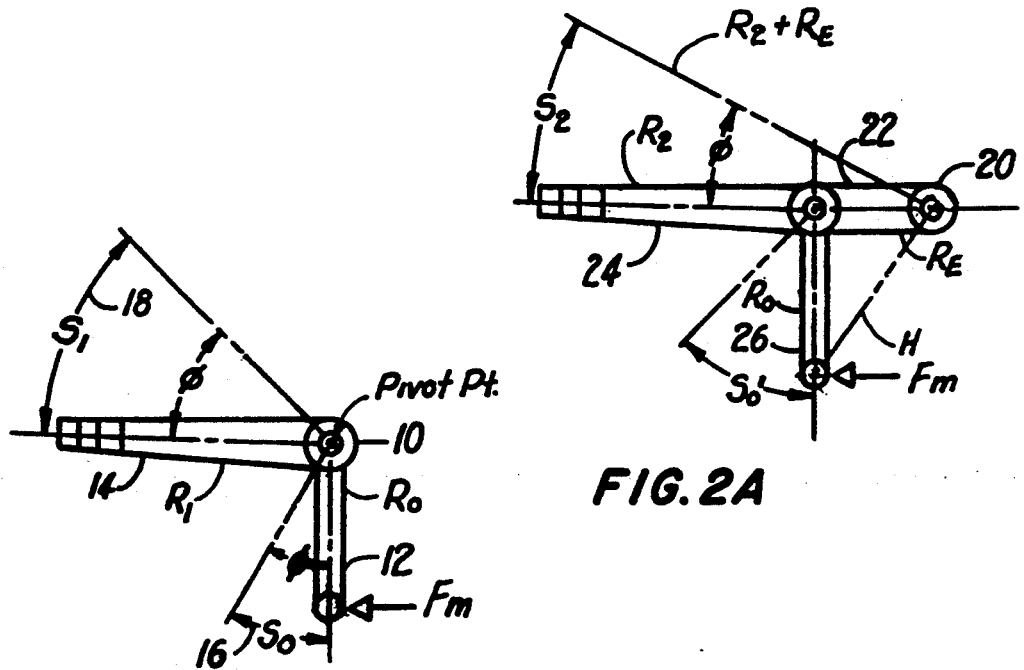
FIG. 2A
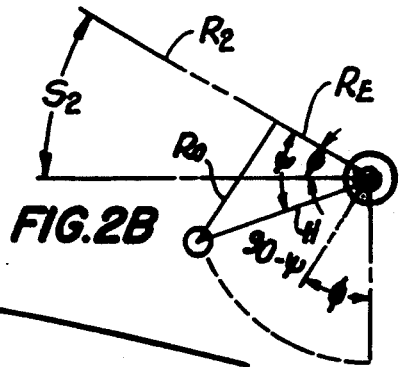
FIG. 1 (PRIOR ART)
FIG. 2B
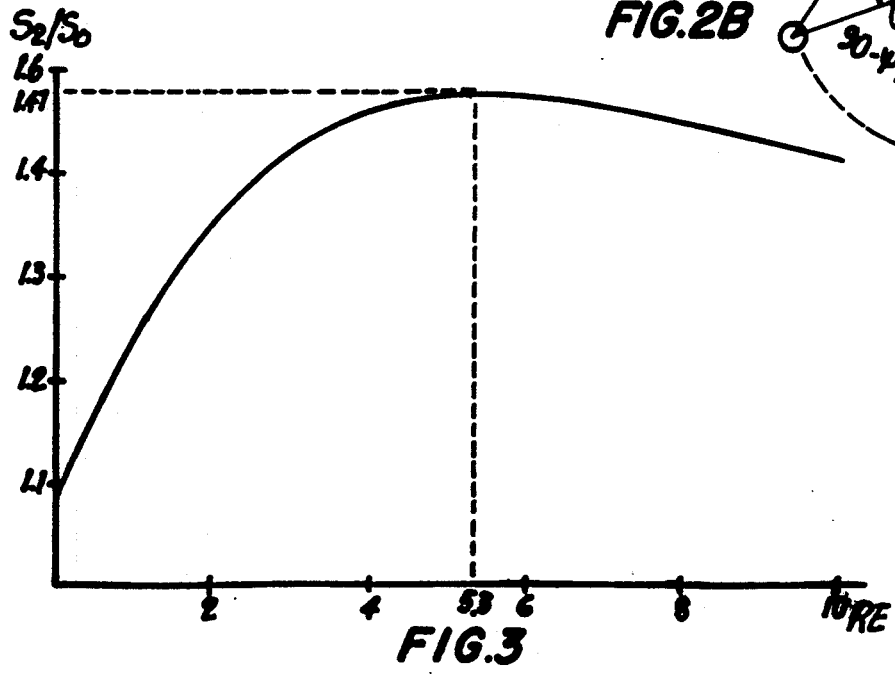
FIG. 3

SPINDLE ASSEMBLY FOR EXTENDING THE TURNING ANGLE OF A MOTOR VEHICLE AND REDUCING TIRE WEAR

TECHNICAL FIELD

This invention relates generally to steering mechanisms for motor vehicles and more particularly to an improved spindle assembly or steering knuckle for use in turning the front wheels of vehicles, and particularly small vehicles having short wheel bases and which make frequent turns.

BACKGROUND ART

The term "steering knuckle" as used herein and is generally understood in the art refers to a unitary mechanical device which is configured to fit into the wheel base of the front wheels of a motor vehicle, and this device mechanically interconnects and couples the vehicle steering tie rods and ball joints to the wheel base assembly. This steering knuckle device includes, among other things, a spindle which is adapted to be received along the rotational axis of the front wheels of a vehicle, and a tie rod arm which is approximately orthogonal to the spindle and has a bore at one end thereof for connecting to a tie rod. This device further includes a centrally located rotational pivot for receiving ball joint arms which operate to provide a central axis of rotation for the device, and it further includes a brake caliper mounting flange positioned on the opposite side of the device from the tie rod arm.

Thus, as is generally well known in the art, the movement of the tie rod of a motor vehicle by an operator turning the steering wheel of the vehicle will produce a corresponding force at the end of the tie rod arm which causes the steering knuckle to rotate about its central axis of rotation. This motion causes the spindle to rotate the wheel of the vehicle in either a clockwise or a counterclockwise direction depending upon whether the tie rod is pushing against or pulling on the ends of the tie rod arms. This operation has been described in detail in many prior art references, including, for example, U.S. Pat. No. 4,600,205 issued to Stewart et al and incorporated herein by reference.

Steering knuckles of the known prior art have their central rotational pivot located in or near the plane in which the tie rod arm is located. Thus, the torque applied to the end of the tie rod arm by the lateral movement of the vehicle tie rods is equal to the effective length of the tie rod arm multiplied by the lateral force applied thereto by the tie rod movement. Thus, the arcuate distance of travel in radians of the end of the spindle and defining the turning angle of the wheel into which the spindle is mounted is linearly proportional to the arcuate distance in radians traveled by the end of the tie rod arm.

In order to increase the arcuate distance of travel of the spindle in response to a fixed tie rod travel distance and thus increase the turning angle of the steering knuckle as may be desired for certain types of vehicular turning applications, this could be achieved simply by reducing the length of the tie rod arm. However, the problem with this approach alone is that it significantly increases the torque required to turn the wheel through a given turning angle and it also reduces the overall steering stability of the vehicle.

DISCLOSURE OF INVENTION

In accordance with the present invention, we have discovered and developed a new and improved approach to steering knuckle construction which enables the turning angle of a front wheel of a vehicle to be increased significantly without necessarily changing the length of its tie rod moment arm. However, as is described below, a small reduction in tie rod arm length may be desirable in certain applications in order to optimize steering knuckle performance. This extension in turning angle may be accomplished with little or no increase in applied torque by the provision of a new and improved steering knuckle device wherein a main upright body member has a tie rod arm extending laterally from one side thereof and a brake capillary mounting flange extending from the other side thereof, with all of these members being adapted and configured to fit into the front wheel base of a motor vehicle. A spindle is positioned so that one end thereof extends through an opening in the main upright body member, and the other end of the spindle extends away from the main upright body member and is oriented approximately perpendicular to the common plane of the main upright body member, tie rod arm, and brake capillary mounting flange.

The main upright body member of the steering knuckle device further includes upper and lower ball joint pivot arms which extend a predetermined distance away from the main body of the device and in a direction opposite to that of the spindle. The ball joint pivot arms have cylindrical bores therein which define the pivotal or rotational axis for the steering knuckle device. Thus, if the length of the spindle is defined as $R_2$, and the length of the tie rod arm is defined as $R_o$, and the effective length of the ball joint pivot arms is defined as $R_E$, then it can be shown that the arcuate travel distance $S_2$, in radians of the spindle is related to the arcuate travel distance, $S_o$, in radians of the end of the tie rod arm by the following expression:

$$S_2 = [(R_2 + R_E)/\sqrt{R_E^2 + R_o^2}] \times S_o$$

That is to say, the above distance $S_2$ of spindle travel in radians is significantly greater than in prior art steering knuckles where the tie rod arms rotate about the main axis of rotation for the steering knuckle hitherto located at or near the vertical plane in which the tie rod arm is located.

Accordingly, the general purpose and principal object of the present invention is to provide a new and improved steering knuckle of the type described which is operative to generate an extended turning angle relative to any known prior art steering knuckles and without requiring any significant increase in torque to the steering knuckle.

Another object of this invention is to provide a new and improved steering knuckle of the type described which may be constructed reliably and economically by applying relatively minor structural modifications to existing steering knuckle designs.

Another object of this invention is to provide a new and improved steering knuckle of the type described which is operative in the front wheel bases of motor vehicles to significantly reduce front tire wear therein, particularly in certain types of small wheel base motor vehicles which are operated with many frequent right and left hand turns.

A novel feature of this invention is the provision of a steering knuckle of the type described comprising one or more ball joint pivot arms having an effective length $R_E$, so that the turning angle of the steering knuckle in radians is linearly proportional to $R_E$ plus the length of the spindle for the steering knuckle.

Another feature of this invention is the provision of a new and improved steering knuckle of the type described which is operative to minimize the total tire surface area-to-road contact area during vehicular wheel turns. This in turn reduces the vectors of sliding friction exerted on the tire surface which are the most responsible for producing wear on tires. These are forward travel momentum vectors which are directed at angles obtuse, acute and orthogonal to the instantaneous turning angle in radians of the wheel and tire, and they are proportionally reduced by reducing the above ratio of tire surface area-to-road contact area during wheel turns of the vehicle.

These and other objects, features, and related advantages of the this invention will become more readily apparent in the following description of the accompanying drawings.

BRIEF DESCRIPTION OF THE DRAWINGS

FIG. 1 is a schematic force-vector diagram illustrating the turning motion of a conventional prior art steering knuckle.

FIGS. 2A and 2B are schematic force-vector diagrams illustrating the turning motion of the steering knuckle manufactured in accordance with the present invention.

FIG. 3 is a curve showing the variation in turning angle $S_2$ in FIGS. 2A and 2B above as a function of variations in the effective extended length, $R_E$, of the upper and lower ball joint pivot arms of the new and improved steering knuckle described herein.

DETAILED DESCRIPTION OF THE PREFERRED EMBODIMENT

Figure 4:
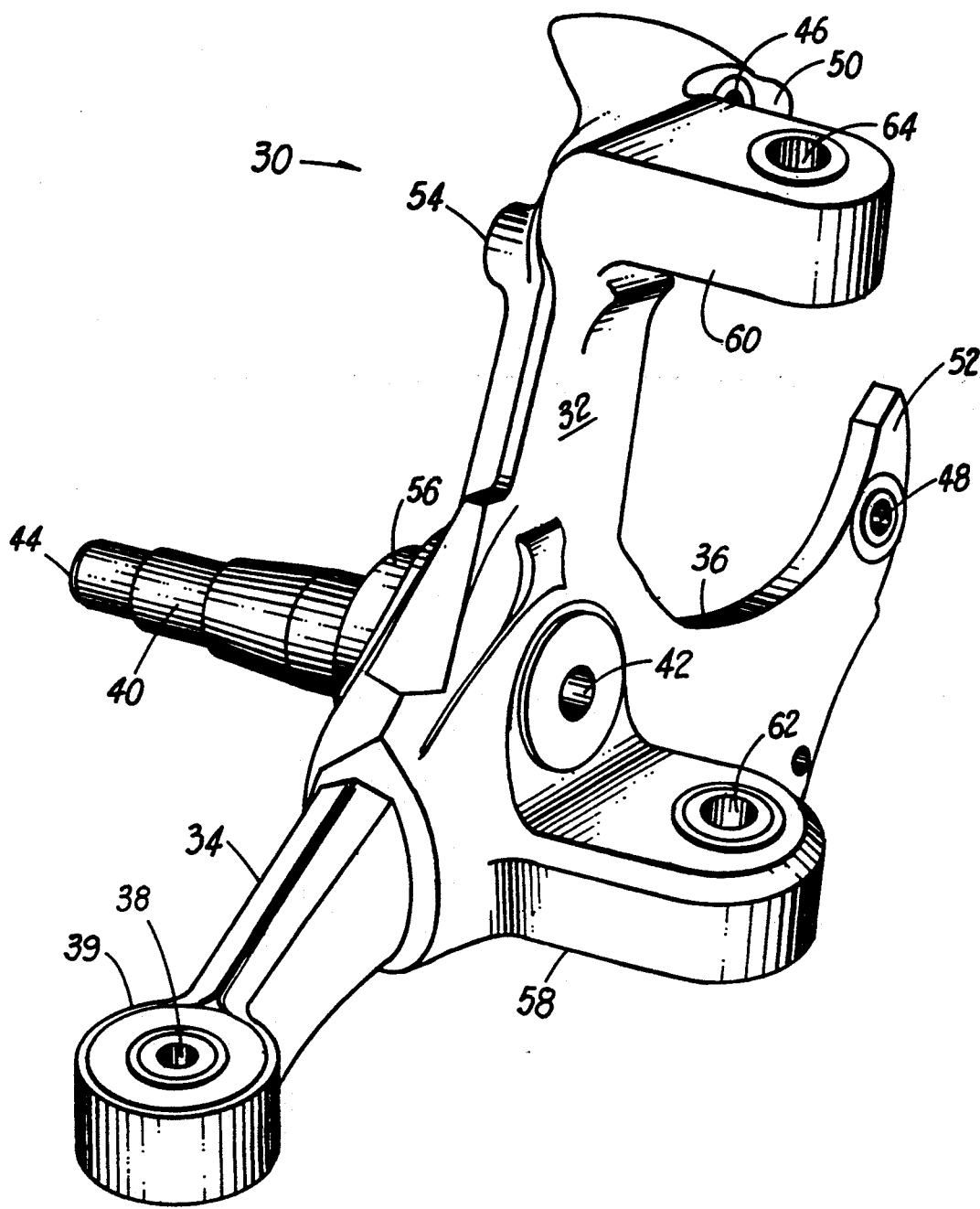
FIG. 4 is a complete isometric view of the new and improved steering knuckle manufactured in accordance with the teachings of the present invention.

Referring now to FIG. 1, there is shown a force-vector schematic diagram representative of the relative positions of the main rotational pivot 10 of a prior art steering knuckle at which steering ball joints are received. A tie rod arm 12 and a spindle 14 are orthogonally positioned as shown to receive a force, $F_M$, representing the moment arm force applied over an effective length $R_o$ of the tie rod arm 12 to produce a turning torque on the steering knuckle.

In accordance with well known principles of force-vector motion, the length of the arc 16 in radians, $S_o$, is equal to the effective length $R_o$ of the tie rod moment arm 12 times the angle $\phi$ through which the moment arm 12 moves. Similarly, the length of the arc 18 in radians $S_1$ is equal to the effective length of the spindle 14, or $R_1$, times the same angle $\phi$ in degrees through which the spindle 14 is moved by the application of a moment arm force $F_M$ applied as indicated to the end of the tie rod arm 12. Thus:

Equation 1: $S_1 = R_1 \times \phi$

Equation 2: $S_o = R_o \times \phi$,

Therefore, cancelling $\phi$,:

Equation 3: $S_1 = S_o [R_1/R_o]$ for a given force, $F_M$, applied to the end of a tie rod arm.

In accordance with the teachings and principles of the present invention and in order to increase the value of $S_1$ to a new corresponding value of $S_2$ for the same applied force $F_M$, the main rotational pivot point 20 as shown in FIGS. 2A and 2B has been extended by the effective length, $R_E$, of the ball joint arms 22. Using this novel approach, the main rotational axis for the steering knuckle is removed by a distance of $R_E$ from the end of the spindle 24 which is defined in FIG. 2A as having an effective length of $R_2$. Now, if the combined total lengths $R_E$ plus $R_2$ are now rotated through the angle $\phi$ as shown in FIGS. 2A and 2B, $S_2$ is now equal to ($R_2$ plus $R_E$) times $\phi$ or Equation 4: $S_2 = (R_2 + R_E) \times \phi$ However, the new arc length $S_o$ which defines the new distance in radians traveled by the end of the new tie rod arm 26 is now proportional to the hypothenuse, H, of the right triangle defined by H, $R_o$ and $R_E$ which has also been rotated through an angle $\phi$ to define the new arc length $S_o'$. However, since H is equal to the square root of $R_E$ squared plus $R_o$ squared, then $S_o'$ is now defined as follows:

Equation 5: $S_o' = (\sqrt{R_E^2 + R_o^2}) \times \phi$

Cancelling $\phi$, we now have $S_2$ defined by the following new expression:

Equation 6: $S_2 = [(R_2 + R_E)/\sqrt{R_E^2 + R_o^2}] \times S_o'$ for a given applied force, $F_M$.

Referring now to the graph in FIG. 3, this graph is a plot of the variation of the ratio of $S_2/S_o'$ for the steering knuckle shown in FIGS. 2A and 2B above and in FIG. 4 below as a function of the extended pivot arm length, $R_E$, in inches. The graph in FIG. 3 was plotted by using a measured value of $R_2$ equal to 6.39 inches and a measured value of $R_o$ equal to 5.88 inches. Thus, it is seen that the ratio of $S_2/S_o'$ peaks in the vicinity of an $R_E$ equal to about 5.3 inches, indicating that a maximum variation in $S_2$ and a corresponding maximum reduction in tire/wheel road contact time during wheel turns will occur for this value of $R_E$ taken together with the additional values of $R_2$ and $R_o$ given above.

Referring now to FIG. 4, there is shown an isometric view of a steering knuckle which has been successfully built and tested and which employs the force vector principles described above with reference to FIGS. 2A, 2B, and FIG. 3. The steering knuckle 30 shown in FIG. 4 has been constructed of a chosen cast iron which is known as meehanite SF 60 ductile iron and includes a main upstanding member 32 from which a tie rod arm 34 extends on one side thereof and from which a brake caliper mounting flange 36 extends in the generally U-shaped configuration shown on the other side thereof. The tie rod arm 34 includes a cylindrical bore 38 located at its cylindrical end 39, and the cylindrical bore 38 is adapted to receive the tie rod ends from the turning wheel steering mechanism (not shown) of the vehicle.

A spindle 40 constructed of a No. 1056 case hardened steel alloy has its larger right hand end 42 mounted in a cylindrical opening within the upright member 32 and has its remote smaller end 44 adapted for positioning along the rotational axis of the wheel base assembly (not shown) into which the steering knuckle 30 is to be fitted. The brake caliper mounting flange 36 has been configured with the generally U-shaped contour shown and has a pair of disc brake caliper mounting holes 46 and 48 located as shown through the outer end sections 50 and 52 of the flange member 36. The upstanding main body member 32 further includes an upper dust cover thread receptacle 54 and a cylindrical wheel bearing oil seal flange 56 which is concentrically mounted with respect to the longitudinal axis of the spindle 40.

A first or lower ball joint pivot arm 58 extends as shown from the lower section of the main body member 32 of the steering knuckle and a second or upper ball joint pivot arm 60 extends as shown from the upper portion of the main upstanding steering knuckle member 32. The lower and upper ball joint pivot arms 58 and 60, respectively, have vertically aligned cylindrical tapered bores 62 and 64 therein which have their centers located an effective distance $R_E$ from a plane that extends down through the center line of the tie rod arm 34 and out through the center of the thickness dimension of the brake caliper mounting flange 36. Thus, when the steering knuckle mechanism shown in FIG. 4 rotates about the vertical axis extending from the center of the cylindrical opening 62 in the lower ball joint pivot arm 58 to the center of the cylindrical opening 64 in the upper ball joint pivot arm 60, the small end 44 of the spindle 40 will be rotated through the new arc distance $S_2$ as indicated in FIGS. 2A and 2B which is greater than the prior art distance $S_1$ in arc radians by a predetermined amount. This amount is determined by the effective extended length $R_E$ as defined above and considered together with any slight reduction in the effective length $R_o$ of the tie rod arm 26 as may be desired to optimize the turning angle-to-torque ratio characteristic for a given steering knuckle application.

As indicated above, the reason that an increase in $S_2$ with respect to the prior art turning angle $S_1$ in arc radians serves to decrease tire wear during the turning of a front wheel of a moving vehicle is that it minimizes the total tire-to-pavement (or other contact surface) area per unit of wheel turning time for any given wheel turn. Stated another way, the total travel distance of the front wheels has been decreased in proportion to the amount that $S_2$ is greater than $S_1$. This represents the total tire surface area that is in contact with the road surface from the instant that a turn is initiated by a vehicle operator to the instant a turn is completed by a vehicle operation.

Since vectors of sliding friction acting against the tire surface are obviously much greater during wheel turns than during straightforward rolling motion, it is particularly critical to minimize this tire surface area-to-road contact area ratio during wheel turns as is accomplished in accordance with the present invention. The reason for this fact is that the forward momentum vectors generated by the moving vehicle continue to act against the tire surface during these wheel turns. These forward momentum vectors in turn produce sliding friction vectors against the tire surface at many different obtuse, acute and orthogonal angles with respect to the instantaneous turning angle of a wheel. And it is these latter vectors of sliding friction that cause the greatest amount of tire wear, and they are significantly minimized in accordance with the teachings of the present invention.

Various constructional and design modifications may be made in and to the preferred commercial embodiment of the present invention as illustrated in FIG. 4 above. However, these constructional and design modifications are clearly within the scope of the following appended claims.

We claim:

1. A steering apparatus having a spindle with an effective length $R_2$ and a tie rod arm with an effective length $R_o$, with the tie rod arm and spindle being joined to a common upstanding member and characterized in that a pair of ball joint pivot arms extend from said member to a pivotal axis of rotation for said apparatus, each of said pivot arms having aligned bores with their centers each located an equal distance $R_E$ from a plane extending down through the center of said tie rod arm and operative to rotate said apparatus about said pivotal axis of rotation through said aligned bores and move the end of said spindle through an arc distance $S_2$ in radians defined by the following equation:

$$S_2 = [(R_2 + R_E)/\sqrt{R_E^2 + R_o^2}] \times S_o'$$

wherein $S_o'$ is the arm distance in radians that the end of said tie rod arm is moved.

2. A steering knuckle operative for rotating the front wheel of a motor vehicle including, in combination, a main upright body member having a tie rod arm extending from one side thereof and a brake capillary mounting flange extending from the other side thereof and all located at or near a common plane which is configured to fit into the front wheel base of a motor vehicle, a spindle positioned so that one end thereof extends through an opening in said main body member and the other end thereof extends away from said main body member and approximately orthogonal to said common plane and adapted for positioning along the rotational axis of said wheel, and a pair of ball joint pivot arms extending from said main body member a predetermined distance and having bores extending therethrough and defining the pivotal rotational axis for said steering knuckle, each of said pivot arms having aligned bores with their centers each located an equal distance $R_E$ from a plane extending down through the center of said tie rod arm.

3. The apparatus defined in claim 2 wherein said spindle has an effective length, $R_2$, said tie rod arm has an effective length $R_o$ and said ball joint pivot arms have an effective length $R_E$, so that when said tie rod arms move through an arc distance $S_o'$, the end of said spindle moves through an arc distance $S_2$ in accordance with the following expression:

$$S_2 = [(R_2 + R_E)/\sqrt{R_E^2 + R_o^2}] \times S_o'.$$

4. Steering apparatus for reducing the time that a tire surface is in contact with the surface of a road during the time that a vehicle is making a turn including, in combination:

a. means for positioning a spindle of said steering apparatus at the rotational axis of a wheel base, and
b. means for rotating said spindle through an angle and arc radians which is proportional to the angle of rotation, $\phi$, of said spindle, multiplied by $R_2$ plus $R_E$, where $R_2$ is equal to the length of said spindle and $R_E$ is equal to an extension length between one end of said spindle and said axis of rotation of said steering apparatus, said axis of rotation being defined by a pair of aligned cylindrical bores located, respectively, in a pair of pivot arms, and each bore having a centerline located at one end of said extension length $R_E$.

5. In a steering knuckle of the type having a tie rod arm and a brake caliper mounting flange joined in the same plane to a main upstanding knuckle member and a spindle extending normal to one side of said plane, the improvement comprising in one-piece casting a pair of ball joint pivot arms extending from the opposite side of said plane and having vertically aligned bores therein each removed from said plane by an equal length $R_E$ so that said spindle pivots about a pair of ball joints located on an axis at the centerline through said aligned bores.

* * * * *